United States Patent [19]
Lemos

[11] Patent Number: 6,009,799
[45] Date of Patent: Jan. 4, 2000

[54] APPARATUS FOR SPLITTING PISTACHIOS

[75] Inventor: Robert F. Lemos, Escalon, Calif.

[73] Assignee: Paramount Farms, Inc., Los Angeles, Calif.

[21] Appl. No.: 08/862,728

[22] Filed: May 23, 1997

[51] Int. Cl.⁷ .................................................. A23N 5/00
[52] U.S. Cl. .............................. 99/571; 99/572; 99/577; 99/579
[58] Field of Search .................... 99/488, 489, 568–583; 426/481–483; 222/56

[56] References Cited

U.S. PATENT DOCUMENTS 5,511,470  4/1996  Lemos .................................... 99/571
5,711,212  1/1998  Lemos .................................... 99/489

*Primary Examiner*—Timothy Simone
*Attorney, Agent, or Firm*—Lyon & Lyon LLP

[57] ABSTRACT

A system for splitting pistachios including an adjustable splitter assembly including plungers driven by cams. The cams are frictionally slidable on a rotating camshaft to allow snubbing of the plungers against the nuts. Cavities on the splitter jaw and plungers include relief holes to avoid crushing of the ends of the nuts and encourage an appropriate split. Cushions between the plungers and cam followers reduces impact on the pistachios.

6 Claims, 9 Drawing Sheets

APPARATUS FOR SPLITTING PISTACHIOS

BACKGROUND OF THE INVENTION

The field of the present invention is apparatus for splitting pistachios which have not opened naturally.

Pistachios are the seed of a small tree of the cashew family. They are referred to as nuts and they come in a hard smooth shell. This shell tends to split along one side when the nut matures but a significant portion of the harvested nuts are not naturally split. Even so, the consumer market demands nuts with the shells split.

Mechanisms have been devised for separating the split nuts from those where the shell has not split. One such mechanism includes a large slowly rotating drum with short fine rigid wires extending into the drum. The split shells become hooked on the wires and ride up on the rotating drum to a higher level than the nuts which have not become hooked. A collector placed upwardly in the drum is positioned to collect the hooked nuts which ultimately fall from the surface of the drum as the drum arches over toward the uppermost position thereof. The unsplit nuts remain in the bottom of the drum and ultimately work their way to the other end. These unsplit nuts are separately collected.

The value of the unsplit pistachios is significantly less than that of the naturally split nuts. To enhance the value of the unsplit nuts, they may be artificially split. A number of ways have been devised for artificially splitting pistachios.

From early times and even concurrently, pistachios have been hand split. Currently it has been found economical to ship the nuts from the United States to China for hand splitting and then return them for sale at a higher price. Many hand devices are understood to be used such as pliers and the like to squeeze the nut until it splits.

Another mechanism which has been devised is to pass the nuts through a tapered area between a rotating conical mandrel and a concentrically arranged cylinder. The nuts must be distorted in compression to pass beyond the mandrel. This distortion is intended to split the nut artificially.

A more promising method has been devised which includes moisturizing the unsplit nuts to soften the shells, making them more resilient. The pistachios with softened shells are then released from the moisturizer and fed to a splitter. Such splitters employ bins for receiving the nuts. The nuts are fed to singulators which include horizontal troughs. A slide plate is positioned in the bottom of the trough and has holes of a size able to receive an individual pistachio. The slide plate has two positions. The first position is with the holes underneath the trough so as to receive nuts retained within the trough. The second position is with the holes outwardly of the trough and above an inclined plate such that the nuts may drop through the holes in the slide plate to the splitter mechanism. The slide plate then returns to the first position to pick up more nuts such that the process may be repeated.

The singulated nuts drop into individual cradles which are U-shaped in cross section and have an elongate axis extending between a movable splitting head and a stationary splitting jaw. Once the singulator has cycled so as to release individual nuts into the cradles, the movable splitting head is moved toward the splitting jaw. The softened shells of the pistachio nuts are split by the pressure placed on the ends. Once split, the cradles are pulled from beneath the nuts to fall on conveying mechanisms. The nuts are then dried and otherwise processed for sale.

U.S. Pat. No. 5,511,470 discloses an apparatus and method for splitting pistachios which form a base for the present invention. The disclosure of U.S. Pat. No. 5,511,470 is incorporated herein by reference. This apparatus and the associated method have been found most useful in the splitting of pistachios. Even so, it remains that some percentage of nuts remains unsplit and some are split to the point of injury in a commercial sense.

SUMMARY OF THE INVENTION

The present invention is directed to improved splitter elements associated with the automatic splitting of nuts with a particular commercial applicability to pistachios.

In a first, separate aspect of the present invention, a splitter jaw assembly includes plunger assemblies with plungers, and first ends of the plungers having plunger cavities. The plungers are adjustably biased toward the cavities. This assembly provides for adjustment of the jaw assembly to accommodate nut size.

In a second, separate aspect of the present invention, opposed cavities are provided on splitter jaws to receive the ends of the nuts. Each cavity includes a concave section and a hole centrally located in the concave section. This arrangement appears to allow the nuts to split more completely toward the ends of the nut without the ends being damaged.

In a third, separate aspect of the present invention, a splitter jaw assembly includes plungers which slide within the assembly for purposes of adjusting for nut size. A camshaft includes cams with eccentric cam surfaces which force the plungers forward to engage the nuts. The cams are slidably mounted on the camshaft and include friction elements so that individual cams can advance to the point that a nut is encountered by the plunger and then stall in that adjusted position. The cam is thereby unable to squeeze the nut but will provide sufficient resistance to hold the nut during the splitting step.

In a fourth, separate aspect of the present invention, the mechanism of the third aspect may further include a cushion which may be in the form of a spring located between the cam and the plunger. The cushion is able to lessen the impact of the plunger as it contacts the nut under the influence of the cam.

In a fifth, separate aspect of the present invention, a feeder includes a singulator plate having holes therethrough, a slide plate beneath the singulator plate which is movable across the holes and a brush above the singulator plate to sweep across the holes. Individual nuts may fall into each hole to be released by the slide plate. The brush acts to eliminate multiple releases per hole. The hole may further be configured to include a shallow portion on the upper side of the singulator to cooperate with the brush.

In a further, separate aspect of the present invention, the combination of various of the foregoing aspects is contemplated.

Accordingly, it is an object of the present invention to provide improved apparatus for the splitting of pistachios. Other and further objects and advantages will appear hereinafter.

DETAILED DESCRIPTION OF THE PREFERRED EMBODIMENTS

Figure 1:
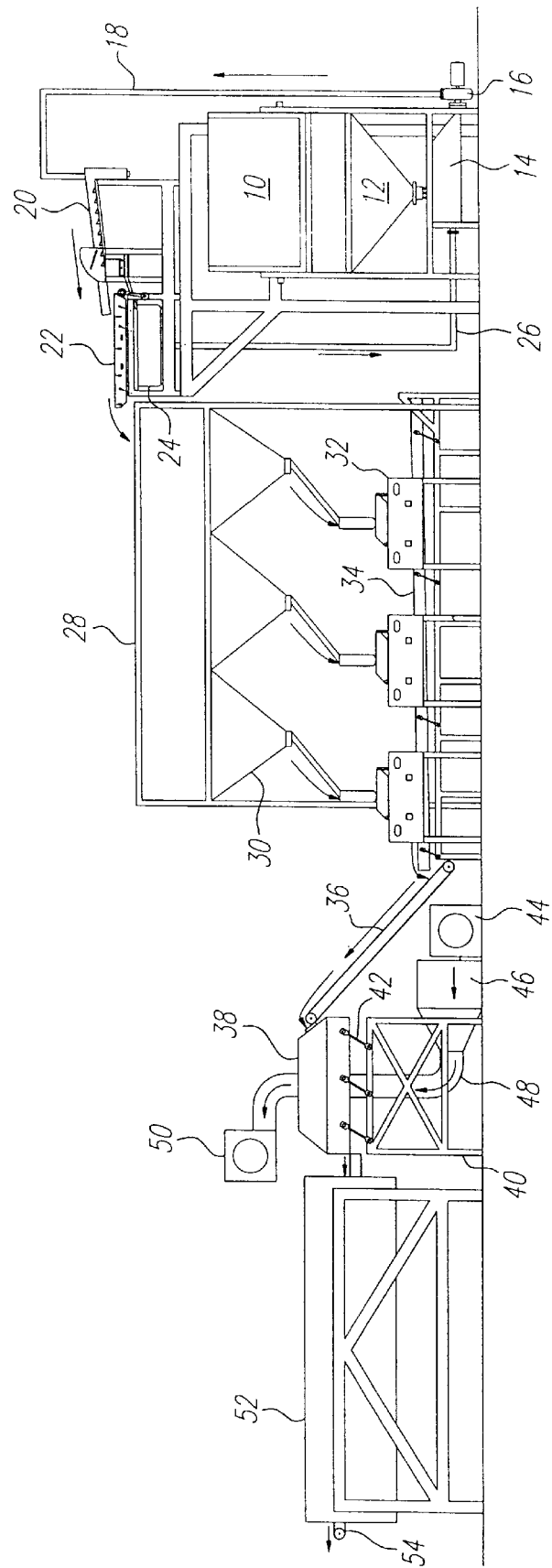
FIG. 1 is a schematic of a process for splitting pistachios.
Figure 2:
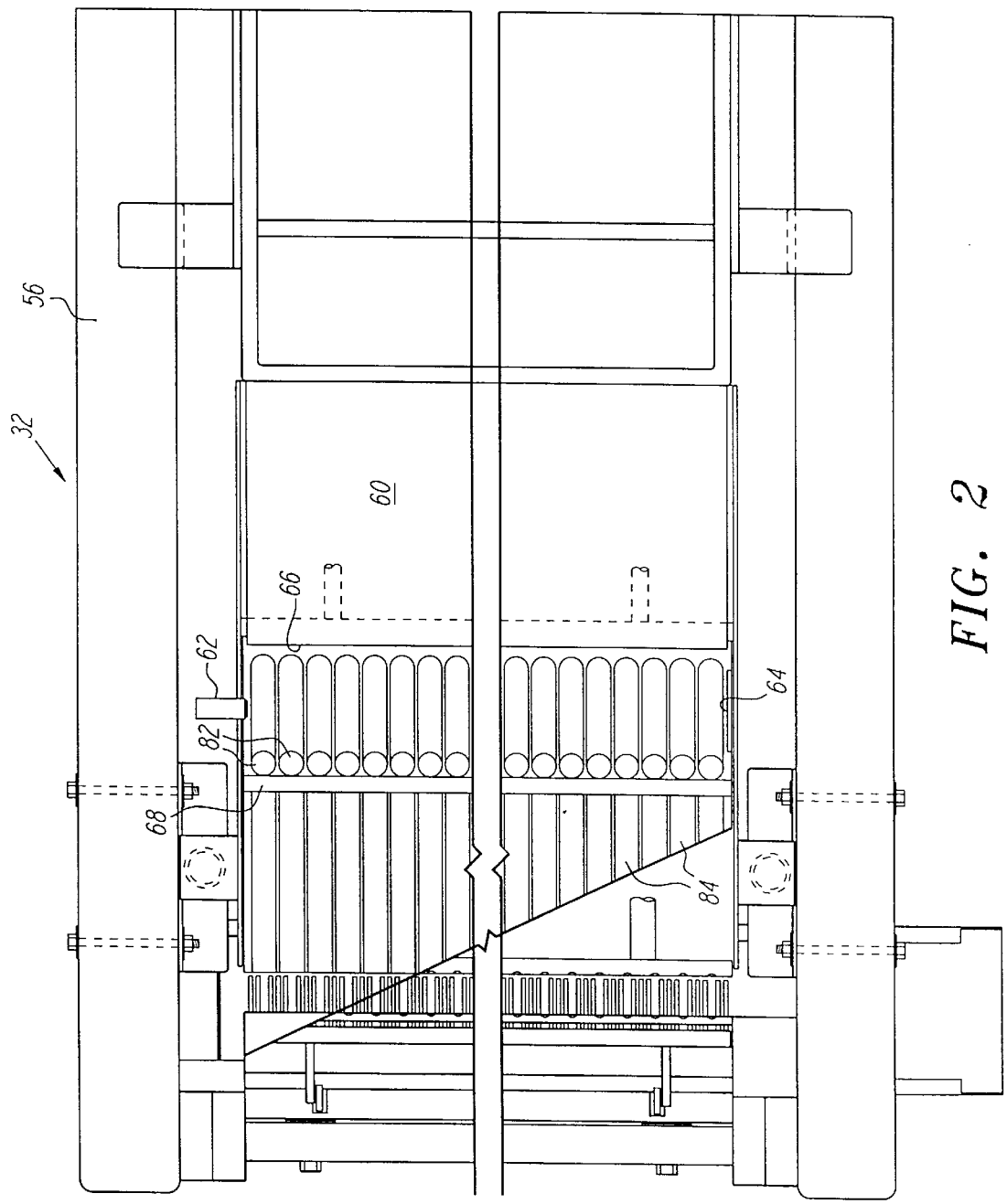
FIG. 2 is a plan view of a pistachio splitter.

Turning in detail to the drawings, FIG. 1 illustrates schematically an overall system for processing unsplit pistachios. A bin dumper 10 receives the unsplit pistachios. The bin dumper 10 includes a tapered lower portion 12 having an outlet to a manifold 14. The manifold 14 is coupled with a food pump 16. The food pump 16 typically employs an open vane impeller capable of pumping water entrained pistachios without damage. An elevator pipe 18 extends from the food pump 16 upwardly to a destoner 20, relying on differential density to exclude rocks from the lighter nuts. The flow then proceeds to a porous conveyor 22 where the pistachios are dewatered. The water is collected in a pan 24 and is returned to the manifold 14 through a return pipe 26.

From the porous conveyor 22, the pistachios are distributed to a hopper 28. Through tapered portions 30, the nuts flow by gravity into splitters 32, three being shown. The nuts are split by the splitters 32 and discharged onto a shaker table 34. The motion of the shaker table 34 is such that the nuts are conveyed to an inclined belt 36 where they are conveyed upwardly to a distorter 38.

The distorter is positioned on a frame 40 by resilient elements 42. A porous screen extends across the interior of the distorter 38 and vibration is induced by a mechanical vibrator. Heated air is introduced by a blower 44 and a burner 46 acting through a conduit 48. An exhaust fan 50 channels the moist warm air flow from the distorter 38. This environment provided by the distorter 38 and attendant components is understood to dry the pistachios in a nonuniform manner, leaving the nuts distorted into an open position.

From the distorter, the product flows to a pin picker 52. The pin picker 52 is a large rotating cylinder having pins extending inwardly from the wall. Opened pistachios are hooked by the pins and conveyed upwardly as the cylinder rotates. As the pins are transported with the rotation of the cylinder, a rotating brush is encountered and the split nuts drop onto a conveyor 54 extending through the cylinder. The conveyor conveys the split pistachios from the picker. Ultimately, the unsplit nuts flow from the bottom of the cylinder and may be further processed as desired.

Turning to the splitter mechanism 32 as best illustrated in FIGS. 2 through 9, the splitter unit 32 includes a frame 56 which provides a base for the equipment mounted thereon. A surge bin 58 receives pistachios from the hopper 28. The nuts are then allowed to move down an inclined ramp 60. A flow control mechanism 61 may be employed to regulate the flow of pistachios down the inclined ramp 60. This flow control mechanism 61 may be controlled by a sensor 62 in association with a reflector 64. The inclined ramp 60 terminates in a trough defined by walls 66 and 68 in which the sensor 62 is positioned.

Figure 4:
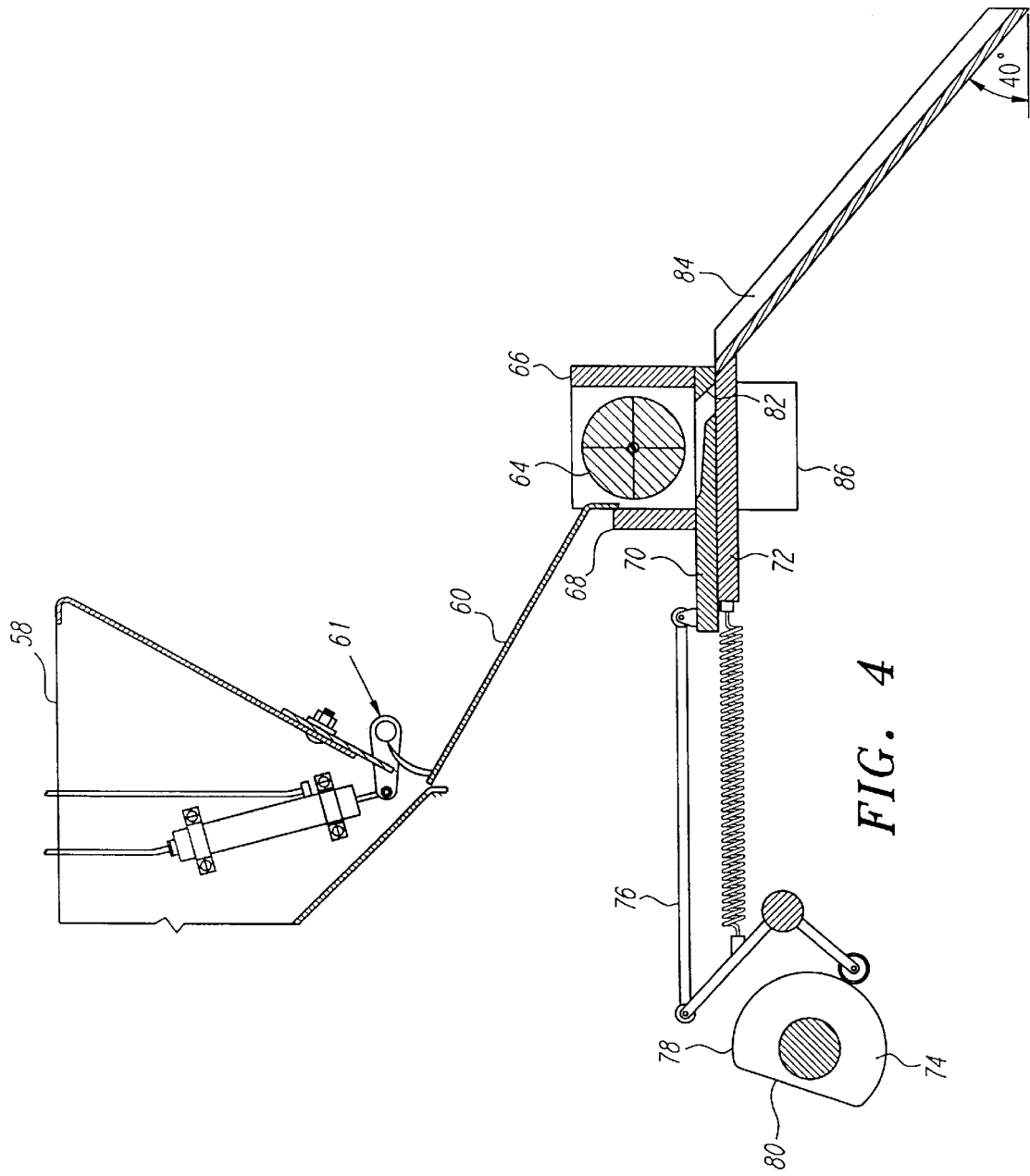
FIG. 4 is a side cross-sectional view of a feed and singulating system of a pistachio splitter.
Figure 5:
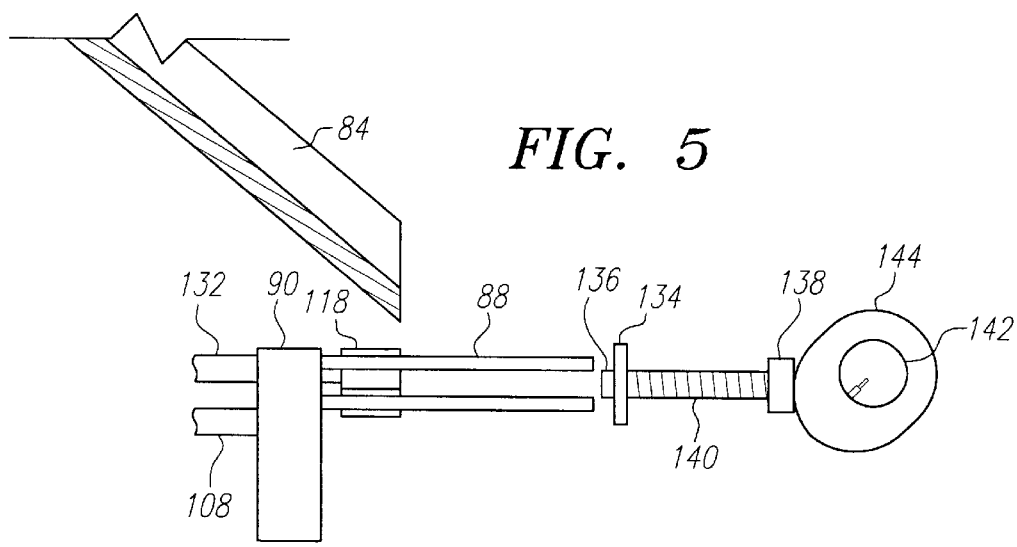
FIG. 5 is an end view of the splitter mechanism of a pistachio splitter.
Figure 6:
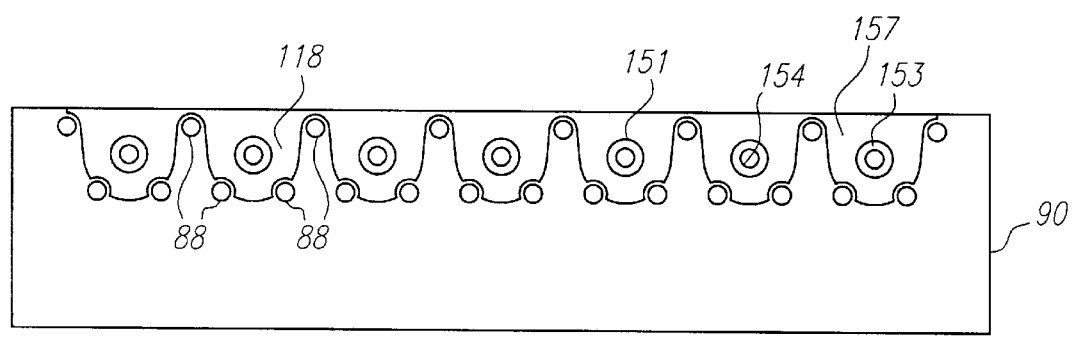
FIG. 6 is a front view of a splitter jaw.

A singulator is located beneath the horizontal trough and includes a slide plate 70 mounted above a fixed plate 72. The slide plate 70 is controlled by a cam 74 and associated linkage 76. The cam 74 is arranged with a circular portion 78 which maintains the slide plate 70 in a first, retracted position as seen in FIG. 4. A flat surface 80 results in the movement of the slide plate 70 to a second position achieved at the middle of the flat surface 80 of the cam 74.

The slide plate 70 includes a plurality of holes 82. The holes open upwardly to the horizontal trough with the slide plate 70 in the first position. The holes 82 are sized and arranged each to receive a single pistachio such that the pistachio would lie fully beneath the upper surface of the slide plate 70. All other nuts in the area of each hole 82 would extend upwardly into the horizontal trough with one such pistachio fully positioned within each hole 82. Movement of the slide plate 70 under the influence of the cam 74 to the second position causes the wall 66 of the horizontal trough to wipe across the holes 82 to retain in the trough all but the pistachios lying fully within the holes 82. In the second position, the holes 82 extend beyond the fixed plate 72 such that the pistachios contained within the holes 82 may drop out the bottom. The nuts are received in inclined slots 84 located beneath the holes 82 with the slide plate 70 in the second position. To enhance the operation of the singulator, a common vibration generator 86 may be fixed to the underside of the device.

The inclined slots 84 are arranged so that the pistachios passing from the singulator will not significantly increase in momentum. Preferably the slots are also slippery so that sufficient angular momentum is not imparted to the nuts. It has been found that a slope of 40° from the horizontal insures flow of the singulated nuts and yet does not increase linear and angular momentum to a point that the nuts will not remain appropriately arranged in the equipment.

Located at the lower end of the inclined slots 84 is the splitting mechanism. Cradles are arranged in alignment with each slot of the inclined slots 84. The cradles are defined by pins 88 extending horizontally from a cradle bar 90. The locations of each of four adjacent pins 88 define an elongated cavity which is generally U-shaped in cross section. The cavities are configured to receive a single pistachio per cavity arranged with the long axis of the pistachio lying along the elongated direction of the cradle.

To insure appropriate placement of each pistachio in a cradle defined by the pins 88, the cradle bar 90 is horizontally vibrated. An eccentric bushing 92 is arranged on a shaft 94 rotatably mounted to the frame 56. A rod 96 is associated with the eccentric bushing 92 and extends at a significant angle upwardly to a clevis mount 98 on the bottom of an exit trough 100. The exit trough 100 is mounted to the frame by means of flex plates 102 which allow horizontal movement in the trough 100. The cradle bar 90 includes rigid arms 104 which extend downwardly to the exit trough 100 and include rollers 106. The vibration induced by the eccentric bushing 92 is transmitted through the exit trough 100 to the rollers 106 in the direction of the axis of the rollers. The vibration is transmitted from the rollers 106 to the cradle bar 90 and in turn to the pins 88. In this way, the cradles are vibrated sideways to better seat the pistachios along their long axes.

Figure 3:
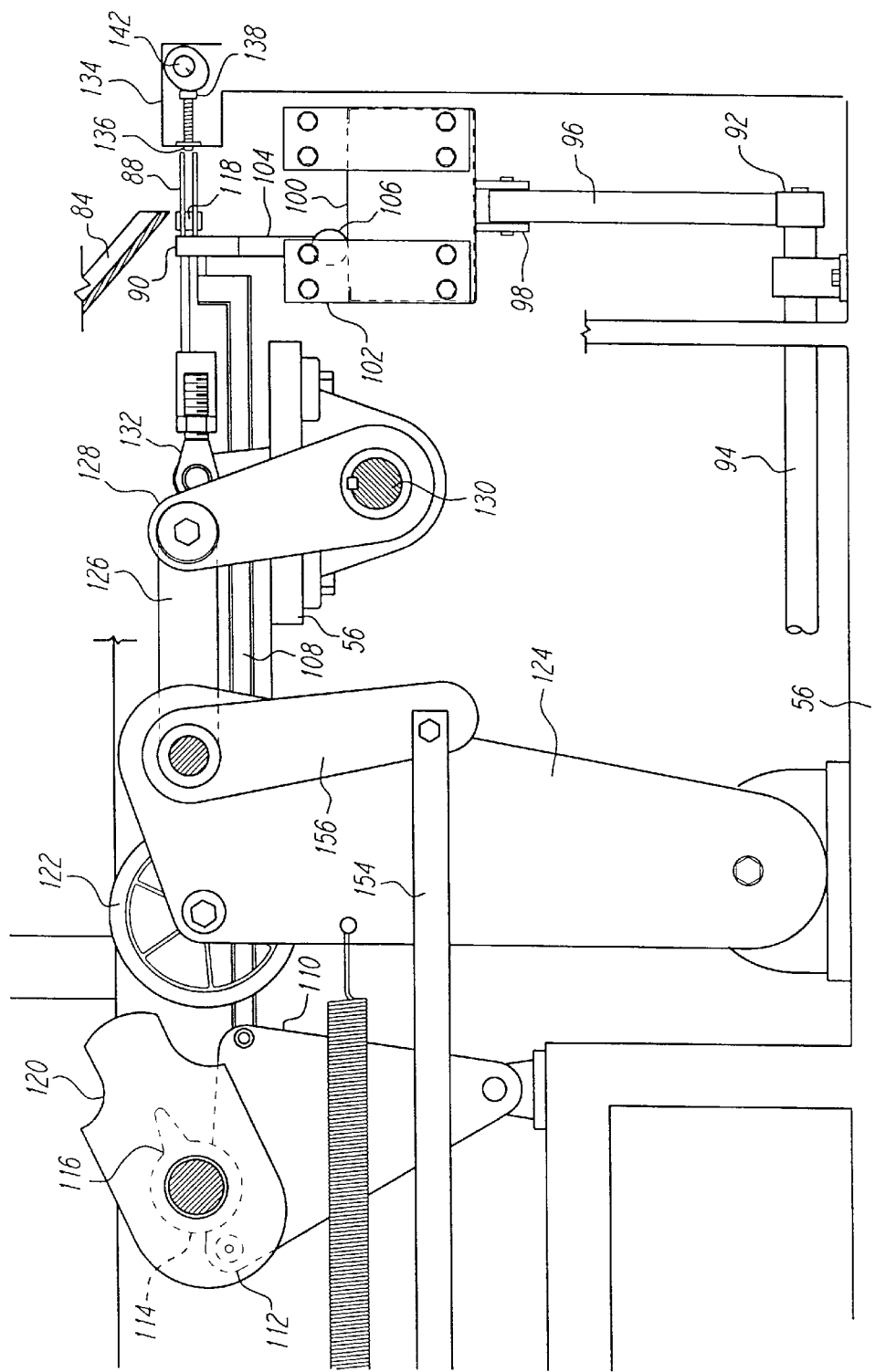
FIG. 3 is a side view of a pistachio splitter.

The cradle bar 90 is associated with a rod 108 which extends to a pivoted arm 110. The arm 110 is pivoted to the frame 56 and includes a follower 112 associated with a cam 114. The movement of the cam 114 controlling the rod 108 is in a direction that the rollers 106 can roll along the exit trough 100. The cam 114 has a lobe 116 which causes the cradles to move to the left as seen in FIG. 3. As will be discussed below, this allows the pistachios to fall from the cradles into the exit trough 100 so as to be moved from the splitter unit.

Two jaw elements are arranged to cooperate within the area of the cradles for splitting of the pistachios. A first splitter jaw 118 is supported on the frame 56 and is controlled by a drive mechanism to move to and from the other splitter jaw. The drive mechanism includes a cam 120 acting through a follower 122 mounted to a pivoted arm 124 which is pivoted on the frame 56. A link 126 is shown in the present embodiment to be coupled with a bell crank 128 pivotally mounted to the frame 56 about a shaft 130. A threaded pin 132, adjustable relative to the splitting head 118, transfers motion from the bell crank 128 to the head 118 such that the head 118 moves toward the opposed splitting jaw.

Opposed to the splitter jaw 118 is a splitter jaw assembly positioned upon a support 134 which may form part of the frame 56. A portion of the support 134 extends along the face of the jaw mechanism and includes holes through which plungers 136 extend. The plungers 136 are positioned to contact one end of a pistachio located in each cradle defined by the pins 88. The plungers 136 include cam followers 138 at one end. A return spring 140 is placed in compression between the support 134 and the cam follower 138 on each plunger 136.

Controlling the plungers 136 is a camshaft 142. The camshaft 142 is rotatably supported by the support 134. The shaft 142 has slidably mounted cams 144 positioned to contact each follower 138. The camshaft has cavities 146 arranged to receive friction elements including friction pads 148 and resilient elements 150 which are preferably compression springs to force the friction pads out to engage the cams 144 to resist rotation of the cams 144 relative to the camshaft 142. Each cam has an eccentric cam surface to cause the plungers 136 to move toward the splitter jaw 118.

Figure 7:
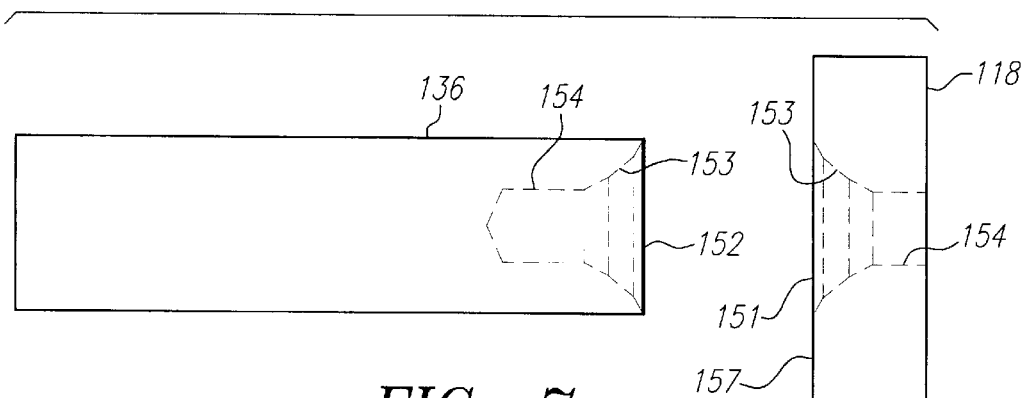
FIG. 7 is a detail side view of a splitter jaw and plunger.
Figure 8:
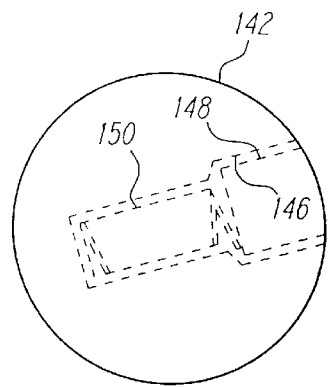
FIG. 8 is an end view of a camshaft.
Figure 9:
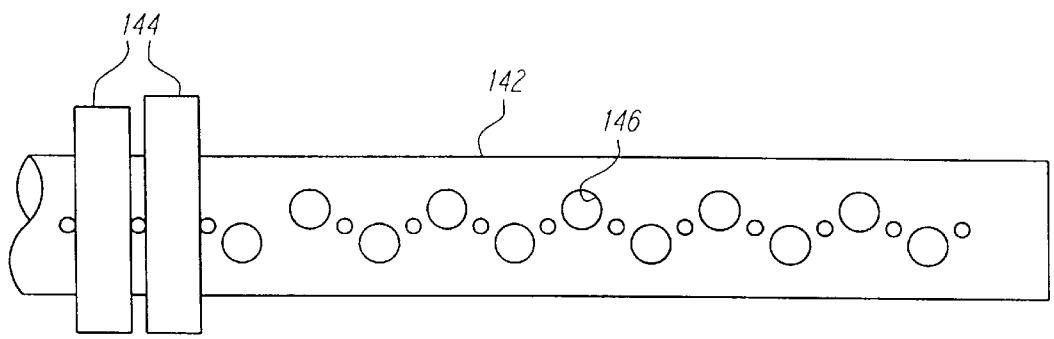
FIG. 9 is a side view of a camshaft with two cams shown positioned thereon.

The splitter jaw 118 includes jaw cavities 151 in the jaw face 157 and the plungers 136 include plunger cavities 152, best illustrated in FIG. 7. The cavities 151 and 152 include concave surfaces 153 which have holes 154 located centrally therein.

In operation, pistachios are distributed to the splitter 32. Singulation occurs and the nuts proceed down the ramps 84 to the cradles defined by the pins 88. Vibration of the cradles helps to orient the pistachios with the ends facing the splitter jaw 118 and the plungers 136. The camshaft 142 is rotated to in turn rotate the cams 144 which act against the plungers 136 to move them toward the splitter jaw 118. The plunger 136 thus is snubbed up against the nut such that the nut extends into each cavity 151 and 152. Because of the friction engagement between the camshaft 142 and the cams 144, the plunger motion does not act to split the nut 136. Rather, an adjustment to accommodate the length of each pistachio in each cradle is performed. Once the plunger 136 is advanced, the splitter jaw 118 is actuated to move toward the plunger 136. This motion causes the pistachios in the splitter to be split. The configuration of the cavities 151 and 152 with the holes 154 act to relieve the ends of the nut so that they are not crushed but are free to participate in the split. The splitter jaw 118 is then retracted and the pins 88 are withdrawn to allow the split pistachios to fall into the exit trough 100. The procedure may then be repeated. By means of a link 155 associated with a lever arm 156, the drive mechanism may actuate a second splitter mechanism associated with the splitter 32.

Even with the cams 144 able to slide with friction on the camshaft 142, the plunger 136 is aligned toward the center of the camshaft 142. Consequently, the forces exerted by the plunger 136 on the cam 144 when the splitter jaw 118 is brought forward provide only a small moment arm about the axis of the camshaft 142. Consequently, the cam 144 is not forced to rotate in a direction allowing the plunger 136 to move away from the pistachio.

The rotation of the camshaft 142 is such that the plungers 136 extend toward the pistachios located in the cradles once the pistachios have had an opportunity to appropriately orient. The rotation of the camshaft 142 is reversed as the pins 88 are withdrawn. This allows the pistachios to drop from the cradles. Once a new charge of pistachios has been completed, the camshaft 142 is again reversed to allow the cams 144 to snub up each plunger 146 on a pistachio. Once the plungers 136 have been placed, the splitter jaw 118 and the plungers 136 experience relative motion toward one another with the splitter jaw 118 moving forward. The nut is split and the process cycles again.

Figure 10:
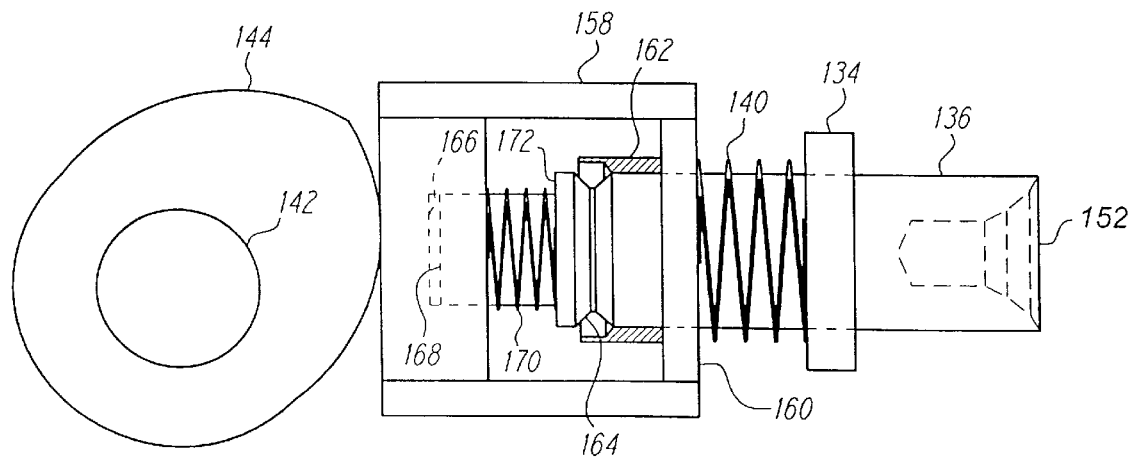
FIG. 10 is a detail side view of a second embodiment of a splitter jaw assembly.

A second embodiment of the splitter jaw assembly is illustrated in FIG. 10. In this embodiment, the plungers 136 are also shown to include similar cavities 152 for receiving the nuts. The support 134 also receives the plunger 136 for sliding motion. A different cam follower 158 is employed. The cam follower 158 is a separate element allowing the plunger 136 to slide in a front wall 160 of the follower 158. A collar 162 is positioned about the body of the plunger 136. A locking ring (not shown) is positioned within a groove 164 in the outer periphery of the plunger 136 to cooperate with the collar 162. This locks the plunger 136 in association with the follower 158. A cavity 166 receives the end 168 of the plunger 136. A cushion in the form of a compression spring 170 is positioned between the rear wall of the follower 158 and a shoulder 172 on the plunger 136. The spring 170 is able to lift the back of the plunger 136 from the follower 158. The collar 162 is dimensioned to accept this movement as indicated in FIG. 10. This spacing and the spring 170 reduces the impact on the nut when the jaws are brought together. Thus, energy for splitting is applied less abruptly and is less likely to improperly shatter or crack the nut adversely.

Figure 11:
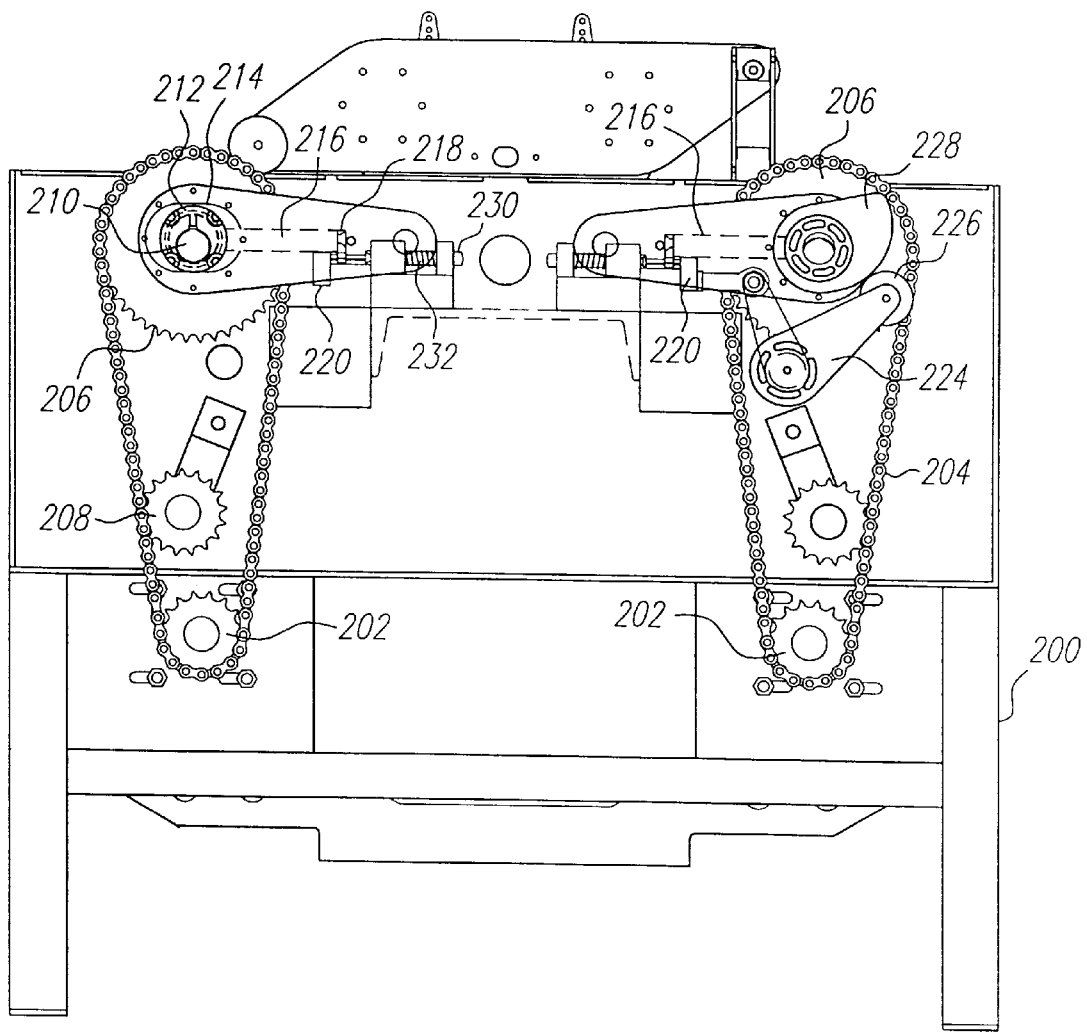
FIG. 11 is a side view partially assembled to show the mechanisms of a second embodiment of a splitter mechanism.
Figure 12:
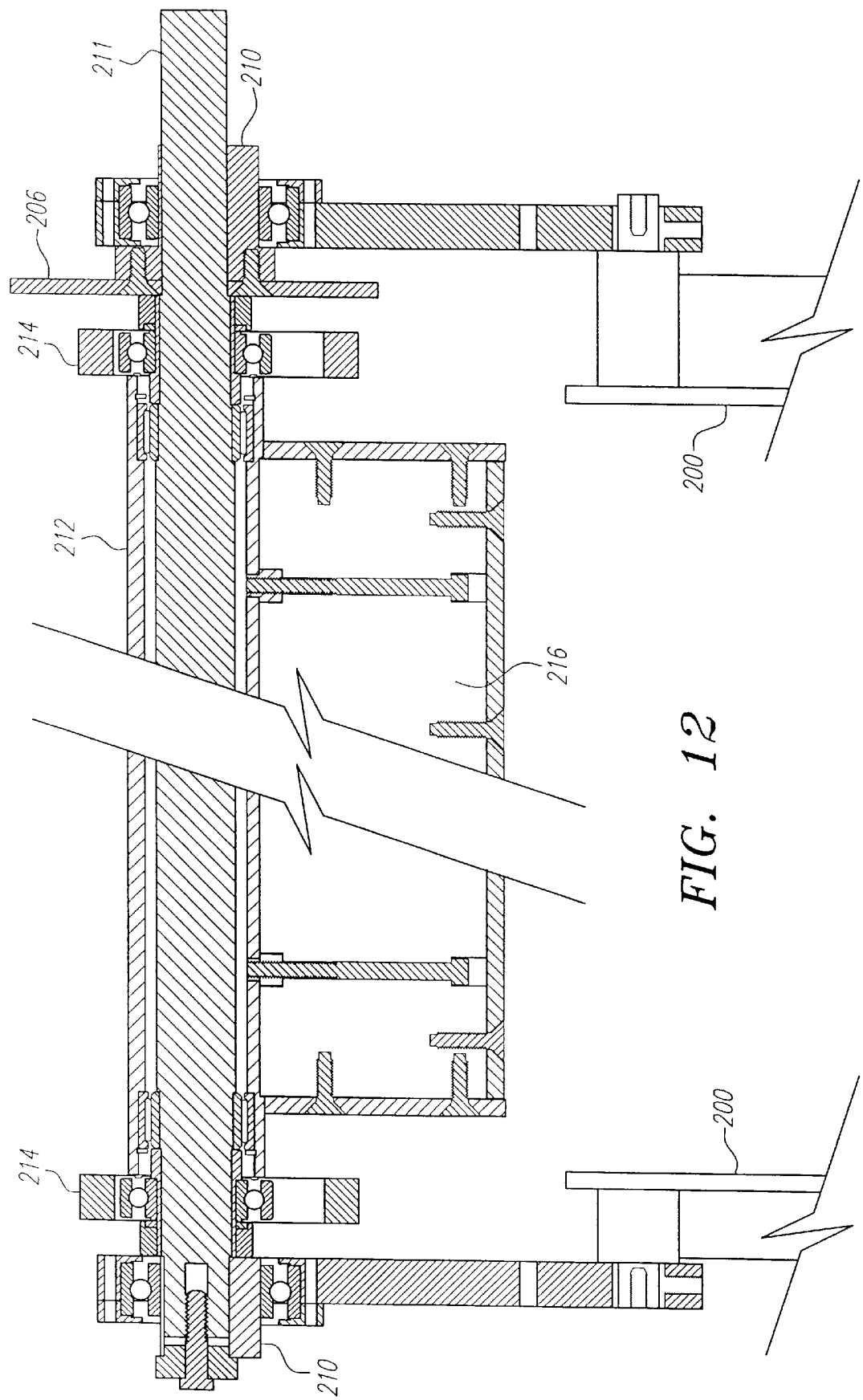
FIG. 12 is a detail plan view of the eccentric drive of the splitter of FIG. 11.
Figure 13:
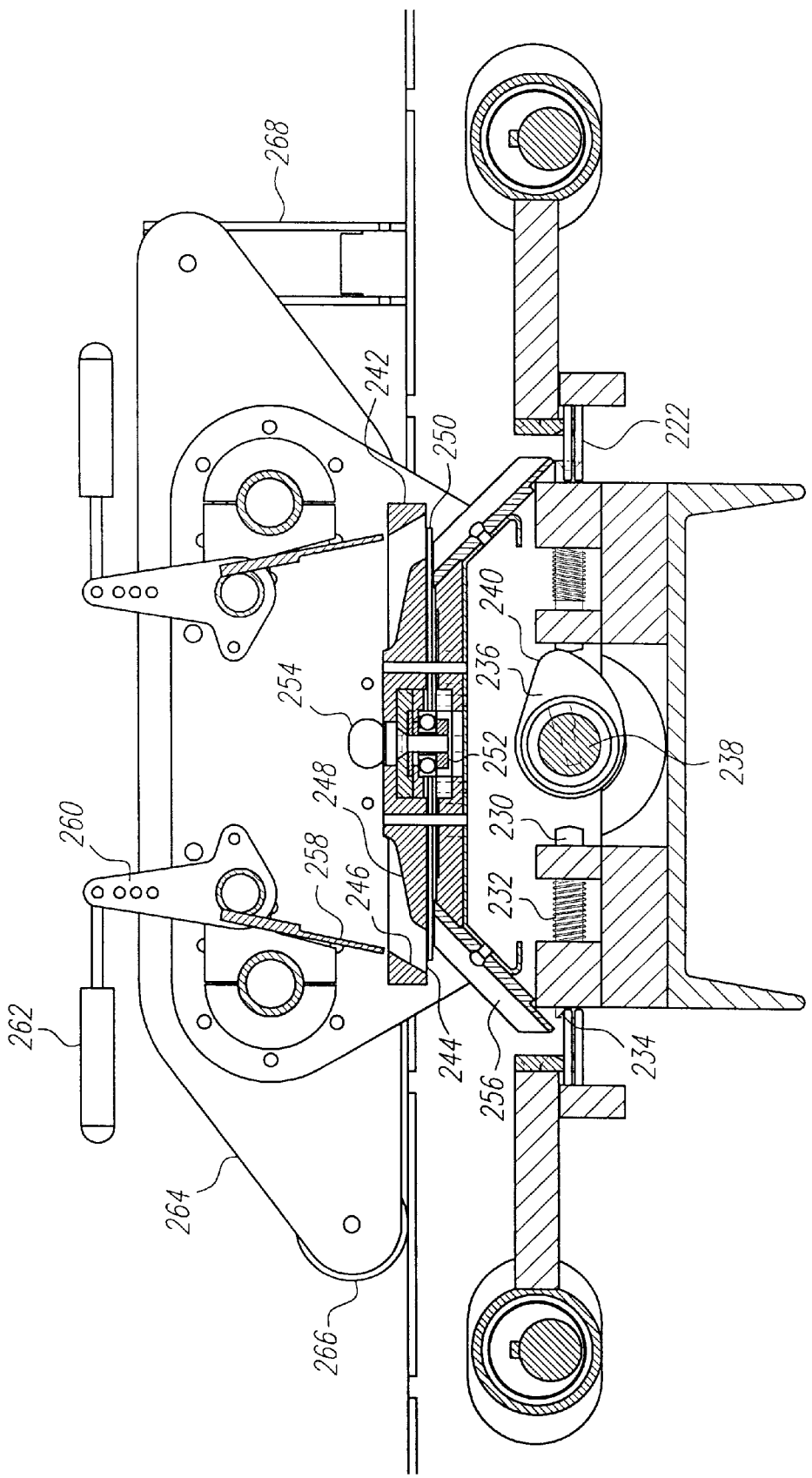
FIG. 13 is a cross-sectional side view of the feeder mechanism and jaws of the splitter of FIG. 11.

FIGS. 11 through 13 illustrate a second embodiment of a splitter mechanism. The mechanism is equally applicable as the first embodiment to the system illustrated in FIG. 1. In FIG. 11, a support, or base, 200 supports a motor (not shown) which drives two drive sprockets 202. The drive sprockets in turn drive roller chains 204 to drive sprockets 206. A chain tensioner 208 is provided with each chain 204. The sprockets 202 are coupled with the electric motor through clutch mechanisms which control power to the sprockets 202.

The sprockets 206 each drive an eccentric 210 having a central shaft 211. The eccentric 210 is mounted to rotate within extensions of the support 200. Thus, the central shaft 211 moves eccentrically about its axis. The central shaft 211 is contained within a follower tube 212. The tube 212 is slidably positioned within an oval guideway 214 and is attached to a splitter deck plate 216. The splitter deck plate 216 is slidably positioned relative to the support base 200.

Through the operation of the drive sprockets 202 through the drive train to the eccentric 210 and the splitter deck plate 216, reciprocal motion is experienced to drive the splitter deck plate 216 horizontally relative to the base 200. A splitter jaw 218 is attached to the splitter deck plate 216. The splitter jaw 218 includes cavities for receipt of the ends of pistachio nuts. In the present embodiment, the splitter deck plate 216 is driven intermittently in a timed sequence with movement of other components.

A cradle bar 220 is located below the splitter deck plate 216 on each side of the splitter assembly. The cradle bar 220 mounts the cradle pins 222 which are arranged in sets of four to receive individual pistachios. On the right hand assembly of FIG. 11, a bell crank 224 is shown to be coupled with the cradle bar 220 and to be driven through a cam follower 226 by a cam 228 driven by the sprocket 206. Cradle pins 222 are withdrawn by this drive system after the splitter deck plate 216 moves forward to cause the splitter jaw 218 to crack the nuts. It should be noted that the two sides of the device of FIG. 11 are mirror images. The Figure shows different portions of the assemblies on either side for clarity of disclosure.

Plunger assemblies are arranged between the splitter deck plates 216 and supported by the base 200. These plunger assemblies include plungers 230 which are slidably supported to move longitudinally. Return springs 232 bias the plungers 230 away from the splitter jaws 218. Cavities 234 are located on a first end of each of the plungers 230. These cavities 234 are to receive the ends of the pistachios. With the splitter deck plates 216 retracted and the plungers 230 operating under the bias of the return springs 232, the jaws are fully open for receiving and positioning pistachios. The deck may be subject to vibration in order that the pistachios will assume a position in the cradle pins 222 with the axis of each nut extending to the cavities on both the splitter jaw 218 and the plungers 230.

Drives are arranged to cooperate with the back end of the plungers 230 to provide an adjustable bias of the plungers 230 toward the splitter jaw 218. These drives are provided by cams 236 rotatably mounted to a camshaft 238 and having cam surfaces 240 which each includes a lobe to drive the plungers 230 toward the splitter jaw 218. The cams 236 are frictionally engaged with the camshaft 238 as has been described above so that the cams will drive the plungers 230 into engagement with the pistachios positioned in the cradles. When substantial resistance is encountered, the cams 236 begin to slide on the camshaft 238 with the splitter jaw and the plungers positioned for a controlled cracking of each nut. Because the cam lobes on the surfaces 240 are substantially in line with the plungers 230, there is only a small moment resulting from the reaction force to movement of the splitter jaw 218. Consequently, the plungers 230 remain positioned as the nuts are split.

The distributor/singulator located above the splitter heads includes a singulator plate 242 which is stationary relative to the support 200. The plate includes holes 244 therethrough. The holes have a through passage 246 and a shallow portion 248. The shallow portion 248 is on the upper side of the singulator plate 242 and is configured so that any nuts sitting within the shallow portion 248 can be brushed from the through passage 246. Thus, only a single nut positioned within the through passage 246 would remain as the surface above the holes 244 is brushed.

A slide plate 250 is below the singulator plate 242. The slide plate includes a slot therethrough which is arranged at 45° on the plate. A bearing 252 is positioned within the slot and an air cylinder 254 moves back and forth across the splitter. This results in the slide plate 250 moving left and right as seen in FIG. 13 to alternately open the through passages 246 on either side of the singulator plate 242. Nuts held within the through passages 246 are then released by the slide plate 250 to slide down the inclined slides 256.

To singulate nuts through the through passages 246, brushes 258 sweep across the holes 244 before the slide plate 250 opens the through passages 246. The brushes 258 are mounted to lever arms 260 which are pivotally mounted relative to the base 200 and controlled by air cylinders 262.

The entire distributor/singulator system is mounted to a structural support 264 which is in turn mounted to the support base 200. The structural support includes eccentrics or electromechanical vibrators to vibrate the support 264 laterally. To provide sufficient freedom for such vibration, the support 264 includes a roller 266 and a flexible mount 268.

In operation, the embodiment of FIGS. 11 through 13 receives nuts into the cavity between the brushes 258 at a controlled rate. The entire distributor/singulator assembly is constantly vibrated. The slide plate 250 is continuously cycled across the holes 244. In timed relation with the slide plate 250, the brushes 258 sweep across the holes 244. The brushes slide toward the shallow portions 248 before the slide plate 250 is moved to open the corresponding through holes 246 and to allow nuts onto the inclined slides 256. The brushes 258 then return to allow the vibrating pistachios to recharge each of the through passages 246.

The nuts which are allowed to slide down the inclined slides 256 come to be positioned on the cradles defined by the cradle pins 222. The splitter jaw 218 and the plungers 230 are retracted at this time. When the nuts are received, the cams 236 are rotated to snub the plungers 230 up against the nuts. Once this has been accomplished, the splitter deck plate 216 is advanced such that the splitter jaw 218 and the plungers 230 will crack the nuts in place. The splitter deck plate 216 is again returned to its rest position, the cradle pins 222 are withdrawn and the cams 236 rotate on to cooperate with the other side of the splitter. The split nuts drop from the equipment onto conveyors for further processing.

Accordingly, an improved pistachio splitting mechanism has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A splitter comprising a base;

a splitter jaw including a jaw face and jaw cavities in the jaw face and being supported by the base;

a splitter jaw assembly including a jaw assembly support supported by the base, plungers slidably supported by the jaw assembly support and having first ends with plunger cavities in opposed orientation to the jaw cavities, respectively, and second ends, a cam shaft rotatably supported on the jaw assembly support, cams having eccentric cam surfaces and being slidably mounted on the cam shaft and abutting the second ends of the plungers, respectively, and friction elements between the cam shaft and the cams, respectively;

a jaw drive on the base and coupled to one of the splitter jaw and the splitter jaw assembly and selectively to move one of the splitter jaw and the splitter jaw assembly toward and away from the other.

2. The splitter of claim 1, the plunger cavities and the jaw cavities each including a concave surface and a hole centrally extending into the jaw element and the plungers, from the concave surfaces, respectively.

3. The splitter of claim 1, the cam shaft including cavities receiving the friction elements, respectively, the friction elements each including a friction pad extending to the cams, respectively, and a resilient element, the resilient elements biasing the friction pads toward the cams, respectively.

4. The splitter of claim 1, the splitter jaw assembly further including return springs between the plungers and the support, respectively.

5. The splitter of claim 4, the plungers further including cam followers slidable on the plungers, respectively, the second ends of the plungers abutting the cam followers, respectively, and the cam followers abutting the cams, respectively, and cushions between the cam followers and the plungers, respectively.

6. A splitter jaw comprising
   a jaw element including a jaw face;
   jaw cavities in the jaw face, each including a concave surface and a hole centrally extending into the jaw element from the concave surface.

* * * * *